Dec. 30, 1930.  C. F. PEITZMAN  1,787,420
VALVE FOR MAINTAINING CONSTANT LIQUID HEIGHT IN TANKS
Filed April 29, 1929

Inventor
Clarence F. Peitzman
By M. Talbert Dick
Attorney

Patented Dec. 30, 1930

1,787,420

UNITED STATES PATENT OFFICE

CLARENCE F. PEITZMAN, OF DALLAS COUNTY, IOWA

VALVE FOR MAINTAINING CONSTANT LIQUID HEIGHT IN TANKS

Application filed April 29, 1929. Serial No. 358,958.

The principal object of this invention is to provide an actuated valve for fluid tank inlet pipes capable of maintaining a predetermined water level in the tank in which it operates.

A further object of my invention is to provide a float actuated valve for fluid tank inlet pipes that automatically acts as a check valve to the liquid in the tank when, for any reason, a fluid pressure is released in the tank inlet supply pipe and the water level in the tank has receded to an elevation where the float is incapable of closing the valve.

A still further object of this invention is to provide a valve for maintaining a constant water height in a tank that is positive in its operation and one that is self cleaning.

A still further object of this invention is to provide a float actuated valve for fluid tank inlet pipes that is easily installed, assembled or disassembled.

A still further object of this invention is to provide a valve for maintaining a constant water height in a tank that is economical in manufacture, durable in use, and refined in appearance.

These and other objects will be apparent to those skilled in the art.

My invention consists in the construction, arrangement, and combination of the various parts of the device, whereby the objects contemplated are attained as hereinafter more fully set forth, pointed out in my claims and illustrated in the accompanying drawings, in which:

Figure 1:
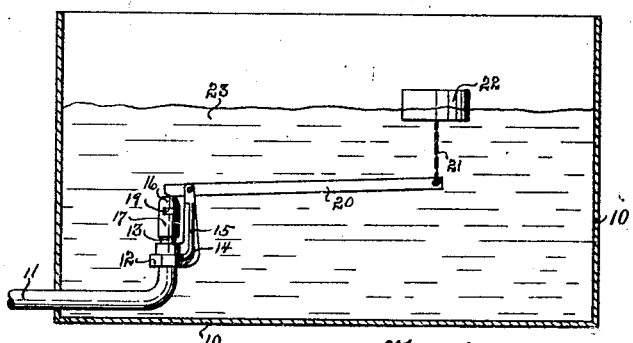
Fig. 1 is a side sectional view of a tank containing a fluid with my complete invention installed therein and in use.

One of the chief objections to the float actuated valves now on the market is their inability to automatically act as a check valve to the water or like fluid in the tank when the float is in a lowered position and when the pressure in the inlet pipe to which the valve is secured is accidentally lost, thereby allowing the water in the tank to run back out of the tank through the inlet pipe. Also, they are sometimes not capable of standing high pressures and because some of their elements are made of deteriorable material, such as rubber and the like, their successful functioning is of short life. I have overcome these objections as will be appreciated by those familiar with float actuated valves.

I have used the numeral 10 to designate the tank in which the liquid is to be maintained approximately at predetermined height. The numeral 11 designates an inlet supply pipe passing into the tank at a low point, having its discharge end terminating in the lower portion of the tank, and its other end designed to be in communication with a source of water supply under pressure. Threaded on to the end of the pipe in the tank is a fixed portion of my valve comprising a nut or base portion 12 and a vertical cylinder 13, and integrally formed on the portion 12 and spaced apart from the cylinder is an arm 14 as shown in the drawings; this arm is strengthened by ribs 15 and extends to a height greater than the height of the cylinder 13.

Figure 3:
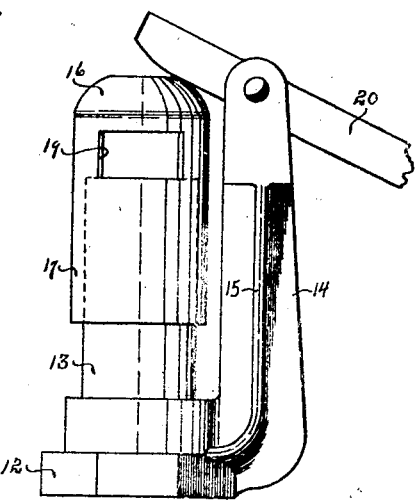
Fig. 3 is a side view of the main portion of my valve in an open position for allowing additional water or fluid to enter the tank.
Figure 4:
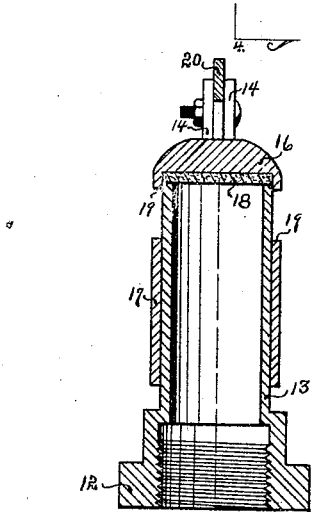
Fig. 4 is a side sectional view of my invention taken on line 4—4 of Fig. 2 and at a right angle to the view shown in Fig. 2 and more fully illustrates its interior construction.

Slidably mounted on the cylinder and having its top 16 capped is a sleeve 17. The numeral 18 designates a disc of any suitable resilient material, but preferably of leather, located in the upper end of the sleeve and adjacent to the top portion 16, and capable of engaging the upper marginal edge of the cylinder 13 when the sleeve is in a lowered position on the cylinder. In the side of the sleeve and at points some distance below the leather disc is a plurality of outlet ports 19. The numeral 20 designates a bar pivoted near one end of the top portion of the arm 14 and having its short end capable of engaging the cap portion of the sleeve 17 as shown in Fig. 1 and Fig. 3. Secured by a chain 21, or the like, to the end portion of the long end of the bar 20, is a float, 22.

By this arrangement and construction, when the water or fluid 23 in the tank is at a desired height as shown in Fig. 1, the float 22 will have the long end of the bar 20 in an elevated position, thereby holding the short end of the bar with great leverage on top of the cap portion 16 of the sleeve 17, thereby forcing and holding the leather disc 18 tightly over the open end of the cylinder 13 and preventing any additional fluid to enter the tank through the pipe 11. As the water 23, or fluid, is used out of the tank, the float 22 will drop accordingly, allowing the long end of the bar 20 to also move downwardly and the short end of the bar to move upwardly and away from the sleeve 17. Without the bar 20 to hold the sleeve in a lowered, tightly closed position, the water or fluid pressure in the cylinder 13 will naturally raise the sleeve 17 to an elevated position in engagement with the bar 20 as shown in Fig. 3, but it will be noted that this height will be such that the liquid from the pipe 11 may pass out of the top of the cylinder 13, into the sleeve 17, and from that sleeve through the ports 19 into the tank. As soon as the water level approaches the desired height, the float will again raise the bar 20 and seal the valve portion so that no further liquid may enter the tank. To prevent any binding in the operation of the device when the bar 20 actuates the sleeve 17, the cap portion 16 is rounded on its outer upper surface and the cap engaging portion of the bar 20 is also rounded as shown in the drawings.

Figure 2:
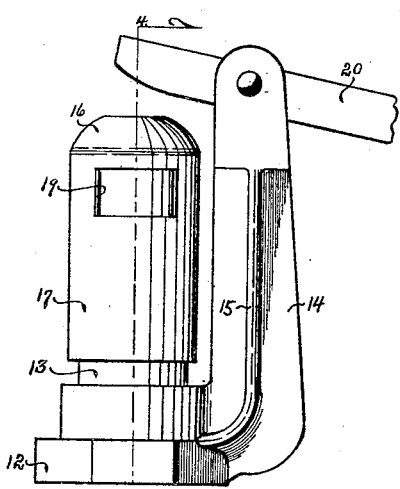
Fig. 2 is a side view of the main portion of my valve showing its condition when in a closed position not actuated by the float mechanism of the invention.

If, for any reason, the bar 20 is out of engagement with the sleeve 17 as shown in Fig. 2 and the liquid pressure in the pipe 11 ceases to exist, the sleeve 17 will automatically move to a lowered position by the pressure of the water in the tank on the same, its own weight, and the sub-pressure in the pipe 11, thereby hermetically sealing the open end of the cylinder 13 and preventing the water 23 in the tank from draining back out of the tank through the pipe 11. This automatic valve check of the water in the tank is very important, as cases often arise where such a function is very necessary.

The height of the maintained water level in the tank 10 may be controlled by adjusting the length of the chain 21 between the float 22 and the end of the bar 20.

By the liquid passing directly from the cylinder 13 through the large ports 19, the device will be capable of self cleaning. If, for any reason, it is desired to disassemble my float actuated valve, it is merely necessary to detach the bar 20 from the arm 14 and slide the sleeve 17 upwardly and off of the cylinder 13. The disc 18 of leather or the like is far enough above the openings 19 to be protected from any harm during the actuating of the valve. Such a disc is very durable and, in fact, is the only element of the invention that might wear out after a very long period of use. However, it is of minor importance, and may be easily replaced with a new one.

The cylinder 13 and sleeve 19 at least should be of non-rusting material such as brass, bronze, copper, or the like, to insure continuous smooth reciprocation of the sleeve on the cylinder.

Some changes may be made in the construction and arrangement of my improved valve for maintaining constant height in a tank, without departing from the real spirit and purpose of my invention and it is my intention to cover by my claims any modified forms of structure or use of mechanical equivalents, which may be reasonably included within their scope.

I claim:

1. In a device of the class described, a base member designed to be threaded on the end of a pipe, a cylinder having one end integrally formed on said base member and having a bore in communication with said pipe, a sleeve slidably mounted on the free end of said cylinder, and having one end closed, said closed end capable of engagement with the free end of said cylinder when said sleeve is moved in one direction, a resilient member between said closed end and said cylinder, outlet ports in the side of said sleeve and located at a point slightly below said resilient member, and a float actuated bar capable of engaging said closed end of the sleeve.

2. In a device of the class described, a base member designed to be threaded on to a pipe, a cylinder member having one end integrally formed on said base member and having a bore designed to be in communication with said pipe, a sleeve slidably mounted on the free end of said cylinder and having one end closed, said closed end capable of closing the free end of said cylinder when said sleeve is moved in one direction, a plurality of ports extending through the side of said sleeve and at a point slightly below said closed end, an arm integrally formed on said base portion and extending beyond said cylinder, a flat actuated bar so pivoted to said arm that when one end of said bar is raised, its opposite end will engage and depress said sleeve.

3. In a device of the class described, a base member designed to be threaded on to a pipe, and located inside a tank, a cylinder member having one end integrally formed on said base and having a bore designed to be in communication with said pipe, a sleeve slidably mounted on the free end of said cylinder and having one end closed, said closed end capable of closing the free end of said cylinder when said sleeve is moved in one direction, a plurality of ports extending through the side of said sleeve at a point slightly below its closed end, an arm integrally formed on said base portion extending beyond said cylinder, a bar pivoted to said arm and having one of its end capable of engaging the said closed end at times, said engaging end of said bar being rounded, a float secured to the opposite end of said bar and ribs formed on said arm for strengthening the same.

4. In a device of the class described, a base member designed to be threaded onto a pipe and located inside a tank, a cylinder member having one end integrally formed on said base and having a bore designed to be in communication with said pipe, a sleeve slidably mounted on the free end of said cylinder and having one end closed; said closed end having its outer side rounded and capable of closing the free end of said cylinder when said sleeve is moved in one direction, a plurality of ports extending through the side of said sleeve at a point below said closed end, an arm integrally formed on said base portion extending beyond said rounded closed end, a bar pivoted to said arm having one of its ends capable of engaging the said rounded closed end of said sleeve at times; said engaging end of said bar being rounded, and a float secured to the opposite end of said bar.

5. In a device of the class described, a base member designed to be threaded onto the end of a pipe, a cylinder having one end integrally formed on said base member and having a bore communicating with said pipe, a sleeve slidably mounted on the free end of said cylinder and having one end closed, said closed end capable of engaging the free end of said cylinder when said sleeve is moved in one direction, an outlet port in the side of said sleeve and located at a point slightly below said closed end, and a float actuated bar capable of engaging said closed end of the sleeve.

6. In a device of the class described, a base member designed to be threaded onto the end of a pipe, a cylinder having one end integrally formed on said base member and having a bore communicating with said pipe, a sleeve slidably mounted on the free end of said cylinder and having one end closed, said closed end capable of engaging the free end of said cylinder when said sleeve is moved in one direction, two outlet ports diametrically opposite from each other in the side of said cylinder and located at points slightly below said closed end, and a float actuated bar capable of engaging said closed end of the sleeve.

CLARENCE F. PEITZMAN.